United States Patent
Manikandan et al.

(10) Patent No.: US 12,387,057 B2
(45) Date of Patent: Aug. 12, 2025

(54) SYSTEM AND METHOD FOR UTILIZING WEAK LEARNERS ON LARGE LANGUAGE MODELS

(71) Applicants: Robert Bosch GmbH, Stuttgart (DE); Carnegie Mellon University, Pittsburgh, PA (US)

(72) Inventors: Hariharan Manikandan, Pittsburgh, PA (US); Yiding Jiang, Pittsburgh, PA (US); Jeremy Kolter, Pittsburgh, PA (US); Chen Qiu, Sindelfingen (DE); Wan-Yi Lin, Wexford, PA (US); Filipe J. Cabrita Condessa, Pittsburgh, PA (US)

(73) Assignees: Robert Bosch GmbH (DE); Carnegie Mellon University, Pittsburgh, PA (US)

(*) Notice: Subject to any disclaimer, the term of this patent is extended or adjusted under 35 U.S.C. 154(b) by 276 days.

(21) Appl. No.: 18/208,083

(22) Filed: Jun. 9, 2023

(65) Prior Publication Data
US 2024/0412004 A1    Dec. 12, 2024

(51) Int. Cl.
G06F 17/00    (2019.01)
G06F 40/157   (2020.01)
G06F 40/40    (2020.01)

(52) U.S. Cl.
CPC ............ G06F 40/40 (2020.01); G06F 40/157 (2020.01)

(58) Field of Classification Search
CPC .......... G06N 20/00; G06N 3/045; G06N 3/09; G06N 5/022; G06N 3/02; G06N 3/08;
(Continued)

(56) References Cited

U.S. PATENT DOCUMENTS

2020/0356891 A1* 11/2020 Saito ...................... G06N 5/045
2022/0005463 A1*  1/2022 Bender ................. G06F 40/289
(Continued)

FOREIGN PATENT DOCUMENTS

WO    WO-2015009586 A2 *  1/2015   ........... G06F 17/246

OTHER PUBLICATIONS

Zhang, Shuo, et al. "Summarizing and exploring tabular data in conversational search." Proceedings of the 43rd International ACM SIGIR Conference on Research and Development in Information Retrieval. 2020. (Year: 2020).*
(Continued)

*Primary Examiner* — Michael Ortiz-Sanchez
(74) *Attorney, Agent, or Firm* — Dickinson Wright PLLC

(57) ABSTRACT

A computer-implemented method includes converting tabular data to a text representation, generating metadata associated with the text representation of the tabular data, outputting one or more natural language data descriptions indicative of the tabular data in response to utilizing a large language model (LLM) and zero-shot prompting of the metadata and text representation of the tabular data, outputting one or more summaries utilizing the LLM and appending a prompt on the one or more natural language data descriptions, selecting a single summary of the one or more summaries in response to the single summary having a smallest validation rate, receiving a query associated with the tabular data, outputting one or more predictions associated with the query, and in response to meeting a convergence threshold with the one or more predictions generated from the one or more iterations, output a final prediction associated with the query.

20 Claims, 6 Drawing Sheets

(58) Field of Classification Search
CPC ........ G06N 3/096; G06N 3/042; G06N 3/088;
G06F 40/40; G06F 40/157; G06F 16/345;
G06F 40/20; G06F 18/214; G06F 30/27;
G06F 40/295; G06F 40/103; G06F
40/183
See application file for complete search history.

(56) References Cited

U.S. PATENT DOCUMENTS

| | | | |
|---|---|---|---|
| 2024/0289371 A1* | 8/2024 | Martínez Galindo | ...................... G06F 16/313 |
| 2024/0311619 A1* | 9/2024 | Licato | .................... G06N 20/00 |
| 2024/0330600 A1* | 10/2024 | Perlitz | .................... G06F 40/30 |

OTHER PUBLICATIONS

Vadim Borisova et al., "Deep Neural Networks and Tabular Data: A Survey," arXiv:2110.01889v1 [cs.LG] Oct. 5, 2021, 19 Pages.
Tom B. Brown et al., "Language Models are Few-Shot Learners." 34th Conference on Neural Information Processing Systems (NeurIPS 2020), Vancouver, Canada, 25 Pages.
Tianqi Chen et al., "XGBoost: A Scalable Tree Boosting System." KDD '16, Aug. 13-17, 2016, San Francisco, CA, USA, 10 Pages.
Ganqu Cui et al., "Prototypical Verbalizer for Prompt-based Few-shot Tuning." arXiv:2203.09770v1 [cs.CL] Mar. 18, 2022, 11 Pages.
Jacob Devlin e al., "BERT: Pre-training of Deep Bidirectional Transformers for Language Understanding." arXiv:1810.04805v1 [cs.CL] Oct. 11, 2018, 14 Pages.
Shizhe Diao et al., "Active Prompting with Chain-of-Thought for Large Language Models." arXiv:2302.12246v3 [cs.CL] May 23, 2023, 20 Pages.
Tuan Dinh et al., "LIFT: Language-Interfaced Fine-Tuning for Non-Language Machine Learning Tasks." arXiv:2206.06565v4 [cs.LG] Oct. 31, 2022, 54 Pages.
Yoav Freund et al., "A Decision-Theoretic Generalization of On-Line Learning and an Application to Boosting." journal of computer and system sciences 55, 119-139 (1997).
Jerome Friedman. "Greedy function approximation: a gradient boosting machine." Annals of statistics 2001, 39 Pages.
Jerome Friedman. "Stochastic gradient boosting." Computational statistics & data analysis 2002, vol. 38, No. 4, 10 Pages.
Yury Gorishniy et al., "Revisiting Deep Learning Models for Tabular Data." 35th Conference on Neural Information Processing Systems (NeurIPS 2021), 12 Pages.
Patrick Haluptzok et al., "Language Models Can Teach Themselves to Program Better." arXiv:2207.14502v1 [cs.LG] Jul. 29, 2022, 15 Pages.
Yaru Hao et al., "Structured Prompting: Scaling In-Context Learning to 1,000 Examples." arXiv:2212.06713v1 [cs.CL] Dec. 13, 2022, 14 Pages.
Jonathan Herzig et al., "TAPAS: Weakly Supervised Table Parsing via Pre-training." arXiv:2004.02349v2 [cs.IR] Apr. 21, 2020, 14 Pages.
Namgyu Ho et al., "Large Language Models Are Reasoning Teachers." abiliarXiv:2212.10071v1 [cs.CL] Dec. 20, 2022, 22 Pages.
Noah Hollmann et al., "TABPFN: a Transformer That Solves Small Tabular Classification Problems in a Second." arXiv:2207.01848v6 [cs.LG] Sep. 16, 2023, 37 Pages.
Bairu Hou et al., "Promptboosting: Black-Box Text Classification With Ten Forward Passes." arXiv:2212.09257v1 [cs.CL] Dec. 19, 2022, 14 Pages.
Shengding Hu et al., "Knowledgeable Prompt-tuning: Incorporating Knowledge into Prompt Verbalizer for Text Classification." arXiv:2108.02035v1 [cs.CL] Aug. 4, 2021, 12 Pages.
Jiaxin Huang et al., "Large Language Models Can Self-Improve." arXiv:2210.11610v2 [cs.CL] Oct. 25, 2022, 19 Pages.
Takeshi Kojima et al., "Large Language Models are Zero-Shot Reasoners." arXiv:2205.11916v1 [cs.CL] May 24, 2022, 36 Pages.

Brian Lester et al., "The Power of Scale for Parameter-Efficient Prompt Tuning." bearXiv:2104.08691v2 [cs.CL] Sep. 2, 2021, 15 Pages.
Aitor Lewkowycz et al., "Solving Quantitative Reasoning Problems with Language Models." arXiv:2206.14858v2 [csCL] Jul. 1, 2022, 54 Pages.
Pengfei Liu et al., "Pre-train, Prompt, and Predict: A Systematic Survey of Prompting Methods in Natural Language Processing." ACM Computing Surveys, vol. 55, No. 9, Article 195. Publication date: Jan. 2023, 35 Pages.
Xiao Liu et al., "GPT Understands, Too." arXiv:2103.10385v1 [cs.CL] Mar. 18, 2021, 10 Pages.
Yinhan Liu et al., "RoBERTa: A Robustly Optimized BERT Pretraining Approach." arXiv:1907.11692v1 [cs.CL] Jul. 26, 2019, 13 Pages.
Avanika Narayan et al., "Can Foundation ModelsWrangle Your Data?" arXiv:2205.09911v2 [cs.LG] Dec. 24, 2022, 12 Pages.
Long Ouyang et al. "Training language models to follow instructions with human feedback." 36th Conference on Neural Information Processing Systems (NeurIPS 2022), 15 Pages.
Guanghui Qin et al., "Learning How to Ask: Querying LMs with Mixtures of Soft Prompts." comarXiv:2104.06599v1 [cs.CL] Apr. 14, 2021, 11 Pages.
Nathanael Carraz Rakotonirina et al., "Can Discrete Information Extraction Prompts Generalize Across Language Models?" arXiv:2302.09865v2 [cs.CL] Mar. 7, 2023, 17 Pages.
Laria Reynolds et al., "Prompt Programming for Large Language Models: Beyond the Few-Shot Paradigm." arXiv:2102.07350v1 [cs.CL] Feb. 15, 2021, 10 Pages.
Swarnadeep Saha et al., "MURMUR: Modular Multi-Step Reasoning for Semi-Structured Data-to-Text Generation." arXiv:2212.08607v1 [cs.CL] Dec. 16, 2022, 22 Pages.
Bernhard Schäfly et al., "Hopular: Modern Hopfield Networks for Tabular Data." arXiv:2206.00664v1 [cs.LG] Jun. 1, 2022, 21 Pages.
Robert E. Schapire. "The strength of weak learnability." Machine learning, 5:197-227, 1990.
Taylor Shin et al., "Autoprompt: Eliciting Knowledge from Language Models with Automatically Generated Prompts." arXiv:2010.15980v2 [cs.CL] Nov. 7, 2020, 15 Pages.
Ravid Shwartz-Ziv et al., "Tabular Data: Deep Learning is Not All You Need." Information Fusion 2022, 11 Pages.
Joaquin Vanschoren et al., "OpenML: networked science in machine learning." arXiv:1407.7722v1 [cs.LG] Jul. 29, 2014, 13 Pages.
Ashish Vaswani et al., "Attention Is All You Need." 31stConferenceon-NeuralInformationProcessingSystems (NIPS2017),LongBeach,CA,USA, 11 Pages.
Han Wang et al., "Automatic Multi-Label Prompting: Simple and Interpretable Few-Shot Classification." arXiv:2204.06305v2 [cs.CL] Apr. 14, 2022, 10 Pages.
Xuezhi Wang et al., "Self-Consistency Improves Chain of Thought Reasoning in Language Models." arXiv:2203.11171v1 [cs.CL] Mar. 21, 2022, 15 Pages.
Zifeng Wang et al., "Learning to Prompt for Continual Learning." Proceedings of the IEEE/CVF Conference on 401 Computer Vision and Pattern Recognition, pp. 139-149, 2022.
Jason Wei et al., "Chain of Thought Prompting Elicits Reasoning in Large Language Models." arXiv:2201.11903v1 [cs.CL] Jan. 28, 2022, 24 Pages.
Pengcheng Yin et al., "TABERT: Pretraining for Joint Understanding of Textual and Tabular Data." modarXiv: 2005.08314v1 [cs.CL] May 17, 2020, 15 Pages.
Wenhao Yu et al., "Generate Rather Than Retrieve: Large Language Models Are Strong Context Generators." arXiv:2209.10063v1 [cs.CL] Sep. 21, 2022, 24 Pages.
Zhuosheng Zhangy et al., "Automatic Chain of Thought Prompting in Large Language Models." arXiv:2210.03493v1 [cs.CL] Oct. 7, 2022, 25 Pages.
Hattie Zhou et al., "Teaching Algorithmic Reasoning via In-context Learning." arXiv:2211.09066v1 [cs.LG] Nov. 15, 2022, 37 Pages.
Yongchao Zhou et al., "Large Language Models Are Human-Level Prompt Engineers." arXiv:2211.01910v1 [cs.LG] Nov. 3, 2022, 40 Pages.

(56) References Cited

OTHER PUBLICATIONS

Frank Nielsen et al., "Introduction to HPC with MPI for Data Science." Springer International Publishing Switzerland 2016, 304 Pages.

* cited by examiner

SYSTEM AND METHOD FOR UTILIZING WEAK LEARNERS ON LARGE LANGUAGE MODELS

TECHNICAL FIELD

The present disclosure relates to generating systems for responding to text queries or human speech input.

BACKGROUND

Weak learners may refer to classifiers that are able to attain better performance than random chance, by some given margin, on any specified distribution over training data. One of the early breakthroughs in machine learning established that weak learning was sufficient for arbitrarily strong classification, via an ensembling procedure. This led to development of boosting algorithms, a class of approaches that continue to perform extremely well, particularly on tabular datasets that lack the input space regularity of vision or language tasks.

In a seemingly separate thread of research, large language models (LLMs) based on the transformer architecture in recent years have come to dominate many natural language domains. These models are often fine-tuned on the data of new downstream tasks, but in recent years have also been shown to exhibit strong performance as zero-shot or few-shot learning solely via prompting the model with a piece of context string.

SUMMARY

A first embodiment, a computer-implemented method for natural-language processing includes receiving tabular data associated with one or more records, convert the tabular data to a text representation indicative of the tabular data, generate metadata associated with the text representation of the tabular data, wherein the metadata is indicative of a description of the tabular data. The method includes, for one or more iterations, outputting one or more natural language data descriptions indicative of the tabular data in response to utilizing a large language model (LLM) and zero-shot prompting of the metadata and text representation of the tabular data, wherein the LLM includes a neural network with a plurality of parameters. Furthermore, for one or more iterations, the method includes outputting one or more summaries utilizing the LLM and appending a prompt on the one or more natural language data descriptions, wherein the one or more summaries include less text than the one or more natural language data descriptions, for one or more iterations, selecting a single summary of the one or more summaries in response to the single summary having a smallest validation rate, receiving a query associated with the tabular data, for one or more iterations, output one or more predictions associated with the query utilizing the LLM on the single summary and the query, and in response to meeting a convergence threshold with the one or more predictions generated from the one or more iterations, output a final prediction associated with the query, wherein the final prediction is selected in response to a weighted-majority vote of all of the one or more predictions generated from the one or more iterations.

A second embodiment discloses a system that includes an input interface to the system, wherein the input interface is configured to receive data associated with the system, and one or more processors in communication with the input interface, the one or more processors processor programmed to receive tabular data associated with one or more records, convert the tabular data to a text representation indicative of the tabular data, generate metadata associated with the text representation of the tabular data, wherein the metadata is indicative of a description of the tabular data. The processor is also programmed to output one or more natural language data descriptions indicative of the tabular data in response to utilizing a large language model (LLM) and zero-shot prompting of the metadata and text representation of the tabular data, wherein the LLM includes a neural network with a plurality of parameters, output one or more summaries utilizing the LLM and the one or more natural language data descriptions, wherein the one or more summaries include less text than the one or more natural language data descriptions, for one or more iterations, select a single summary of the one or more summaries in response to the single summary having a smallest validation rate, receive a query associated with the tabular data, for one or more iterations, output one or more predictions associated with the query utilizing the LLM on the single summary and the query; and in response to meeting a convergence threshold with the one or more predictions generated from the one or more iterations of outputting one or more predictions, output a final prediction associated with the query.

A third embodiment discloses, computer-implemented method for natural-language processing, the method including receiving tabular data associated with one or more records, converting the tabular data to a text representation indicative of the tabular data, generating metadata associated with the text representation of the tabular data, wherein the metadata is indicative of a description of the tabular data, outputting one or more natural language data descriptions indicative of the tabular data in response to utilizing a large language model (LLM) and zero-shot prompting of the metadata and text representation of the tabular data; outputting one or more summaries utilizing the LLM and appending a prompt on the one or more natural language data descriptions, wherein the one or more summaries include less text than the one or more natural language data descriptions, for one or more iterations, selecting a single summary of the one or more summaries in response to the single summary having a smallest validation rate, creating a subset of single summaries, receiving a query associated with the tabular data, for one or more iterations, output one or more predictions associated with the query utilizing the LLM on one of the single summaries of the subset of single summaries and the query, creating a subset of one or more predictions, and in response to meeting a convergence threshold with the subset of one or more predictions, output a final prediction associated with the query, wherein the final prediction is selected in response to a weighted-majority vote of the subset of one or more predictions.

DETAILED DESCRIPTION

Figure 1:
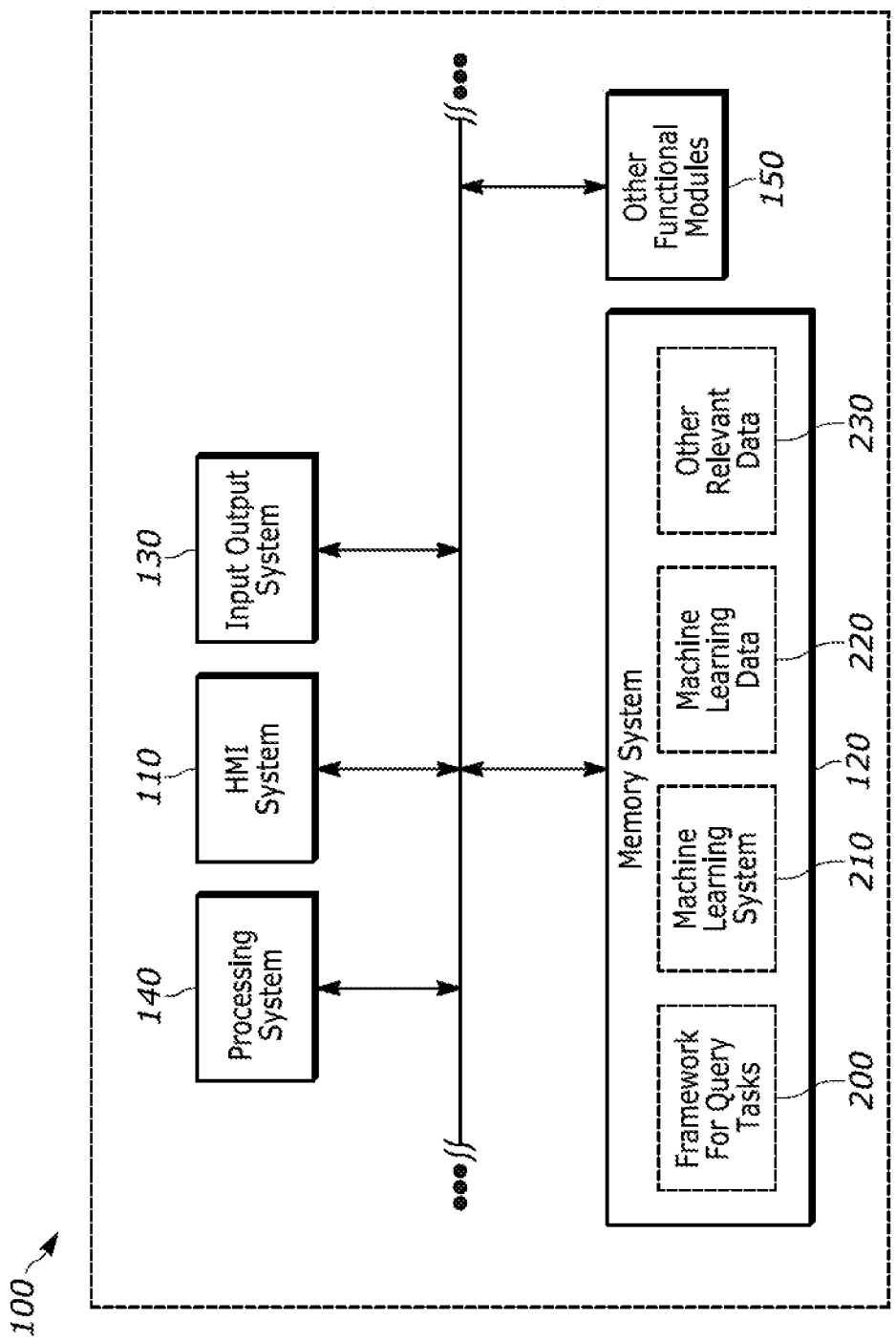
FIG. 1 is a diagram of an example of a system with a framework for query tasks according to an example embodiment of this disclosure.

A central notion in practical and theoretical machine learning is that of a weak learner, classifiers that achieve better-than-random performance (on any given distribution over data), even by a small margin. Such weak learners form the practical basis for canonical machine learning methods such as boosting. In the embodiment disclosed below, a system and method illustrate that prompt-based large language models can operate effectively as said weak learners. Specifically, the system and method may illustrate the use of a large language model (LLM) as a weak learner in a boosting algorithm applied to tabular data. The system may show that by providing (properly sampled according to the distribution of interest) text descriptions of tabular data samples, LLMs can produce a summary of the samples that serves as a template for classification and achieves the aim of acting as a weak learner on this task. The system and method may incorporate these models into a boosting approach, which in some settings can leverage the knowledge within the LLM to outperform traditional tree-based boosting. The model outperforms both few-shot learning and occasionally even more involved fine-tuning procedures, particularly for tasks involving small numbers of data points. The results illustrate the potential for prompt-based LLMs to function not just as few-shot learners themselves, but as components of larger machine learning pipelines.

The disclosure below is an example of LLMs serving as weak learners in a boosting framework, specifically on tabular data to show that by appropriately converting tabular data to text form, and asking LLMs to summarize a carefully chosen set of examples from the data, a system can produce a summary of the examples that can serve as a template (e.g., a prompt) for a tabular data classifier, and one which typically achieves this weak learning aim. This enables us to correspondingly integrate this collection of LLM-generated weak learners into a boosting framework.

The system may show that the resulting approach performs well in many settings, and outperforming zero-shot and few-shot classification, as well as "single-shot" summaries generated by the LLM. This is all done via a system that may be without any retraining or fine-tuning of the LLM itself, but rather only via prompting. Furthermore, on certain domains (particularly those with very few examples, where leveraging the prior knowledge built into LLMs would be of particular importance), the system may show that the approach can even outperform traditional tree-based boosting and LLM-based fine tuning methods and its performance would likely improve as LLMs capabilities improve. Overall, the system may highlight the potential of incorporating LLMs as sub-routines of a larger machine learning system.

The system and method below may utilize LLMs to generate weak learners, and in turn, uses these weak learners within a boosting framework. This may be referred to as LLM Summary Boosting, as an embodiment may include one where the core learning process may be one that uses a language model to create a summary of (specifically chosen) samples from the dataset. These summaries may function as prompts by which the system can make predictions on new examples. Finally, the system may use boosting to construct an ensemble of these summaries that provides the overall predictions on new data points.

FIG. 1 is a diagram of an example of a system 100 with a neuro-symbolic framework 200 for query tasks according to an example embodiment. The system 100 is configured to pre-train (or train) the machine learning system 210 via the neuro-symbolic framework 200. In addition, the system 100 is an example of a system configured to perform on the machine learning system 210 via the framework 200. After undergoing pre-training (or both pre-training and zero-shot testing), the system 100 may be configured to employ the machine learning system 210 for use. Alternatively, the system 100 may be configured to enable the pre-trained (or pre-trained and zero-shot tested) machine learning system 210 to be employed and/or deployed in another system (e.g. system 300 of FIG. 3) for use.

The system 100 includes at least a processing system 140. The processing system 140 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 140 is operable to provide the functionality of the framework 200 and the machine learning system 210, as described herein.

The system 100 includes at least a memory system 120, which is operatively connected to the processing system 140. In an example embodiment, the memory system 120 includes at least one non-transitory computer readable medium, which is configured to store and provide access to various data to enable at least the processing system 140 to perform the operations and functionalities with respect to the framework 200 and corresponding machine learning system 210, as disclosed herein. In an example embodiment, the memory system 120 comprises a single computer readable storage device or a plurality of computer readable storage devices. The memory system 120 can include electrical, electronic, magnetic, optical, semiconductor, electromagnetic, or any suitable storage technology that is operable with the system 100. For instance, in an example embodiment, the memory system 120 can include random access memory (RAM), read only memory (ROM), flash memory, a disk drive, a memory card, an optical storage device, a magnetic storage device, a memory module, any suitable type of memory device, or any number and any combination thereof. With respect to the processing system 140 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 140 and/or other components of the system 100.

The memory system 120 includes at least the framework 200, the machine learning system 210, machine learning data 220, and other relevant data 230, which are stored thereon and accessible therefrom. The framework 200 includes computer readable data that, when executed by the processing system 140, is configured to generate at least one training set with a suitable number of query tasks for the machine learning system 210. In addition, the framework

200 includes computer readable data that, when executed by the processing system 140, is configured to implement a zero-shot testing process (or a zero-shot evaluation process) to evaluate the pre-trained (or trained) machine learning system 210 with respect to various commonsense tasks. The computer readable data can include instructions, code, routines, various related data, any software technology, or any number and combination thereof.

In an example embodiment, the machine learning system 210 includes at least one machine learning model. More specifically, the machine learning system 210 includes at least one language model. For example, the machine learning system 210 includes a large language model (LLM), or any number language models and combination thereof.

In an example embodiment, the machine learning data 220 includes various data, which the framework 200 uses to train, test, and develop the machine teaming system 210. For example, the machine learning data 220 includes a global knowledge graph 220A. The global knowledge graph 220A is generated by combining various knowledge graphs 220B. The machine learning data 220 may also include one or more knowledge bases, which are associated with one or more of the knowledge graphs 220B. The machine learning data 220 also includes a set of commonsense task datasets 220C, which cover a diverse set of tasks. In addition, the machine learning data 220 may also include various annotations, various loss data, various parameter data, as well as any related data that enables the neuro-symbolic framework 200 and the machine learning system 210 to perform the functions as described herein while meeting certain performance criteria. Meanwhile, the other relevant data 230 provides various data (e.g. operating system, etc.), which enables the system 100 to perform the functions as discussed herein.

In an example embodiment, as shown in FIG. 1, the system 100 is configured to include at least one human machine interface (HMI) system 110. The HMI system 110 includes at least one user interface, at least one HMI device, or any number of combination thereof. For example, the HMI system 110 may include a visual user interface, an auditory user interface, a tactile user interface, any suitable user interface, or any number and combination thereof. The HMI system 110 is operable to communicate with the I/O system 130. The HMI system 110 is also operable to communicate with one or more other components (e.g., processing system 140, memory system 120, etc.) of the system 100. More specifically, for example, the processing system 140 is configured to obtain or extract a query or a query task directly or indirectly from the HMI system 110, the memory system 120, and/or the I/O system 130. Upon receiving the query or query task, the processing system 140 is configured to provide a predicted answer to the query or query task via the machine learning system 210.

In addition, the system 100 includes other components that contribute to the training and/or execution of the framework 200 and the machine learning system 210. For example, as shown in FIG. 1, the memory system 120 is also configured to store other relevant data 230, which relates to operation of the system 100 in relation to one or more components (e.g., sensor system 110, I/O system 130, and other functional modules 150). In addition, the VO system 130 may include an VO interface and may include one or more devices (e.g., microphone, key board device, touch display device, microphone, mouse, speaker device, etc.). Also, the system 100 includes other functional modules 150, such as any appropriate hardware technology, software technology, or combination thereof that assist with or contribute to the functioning of the system 100. For example, the other functional modules 150 include communication technology that enables components of the system 100 to communicate with each other as described herein. Accordingly, with at least the components shown in FIG. 1, the system 100 is configured to execute the framework 200 to pre-train (or train) the machine learning system 210 to perform well across various query tasks (e.g. question-answering tasks) in a zero-shot setting or when deployed/employed for use in an application.

Figure 2:
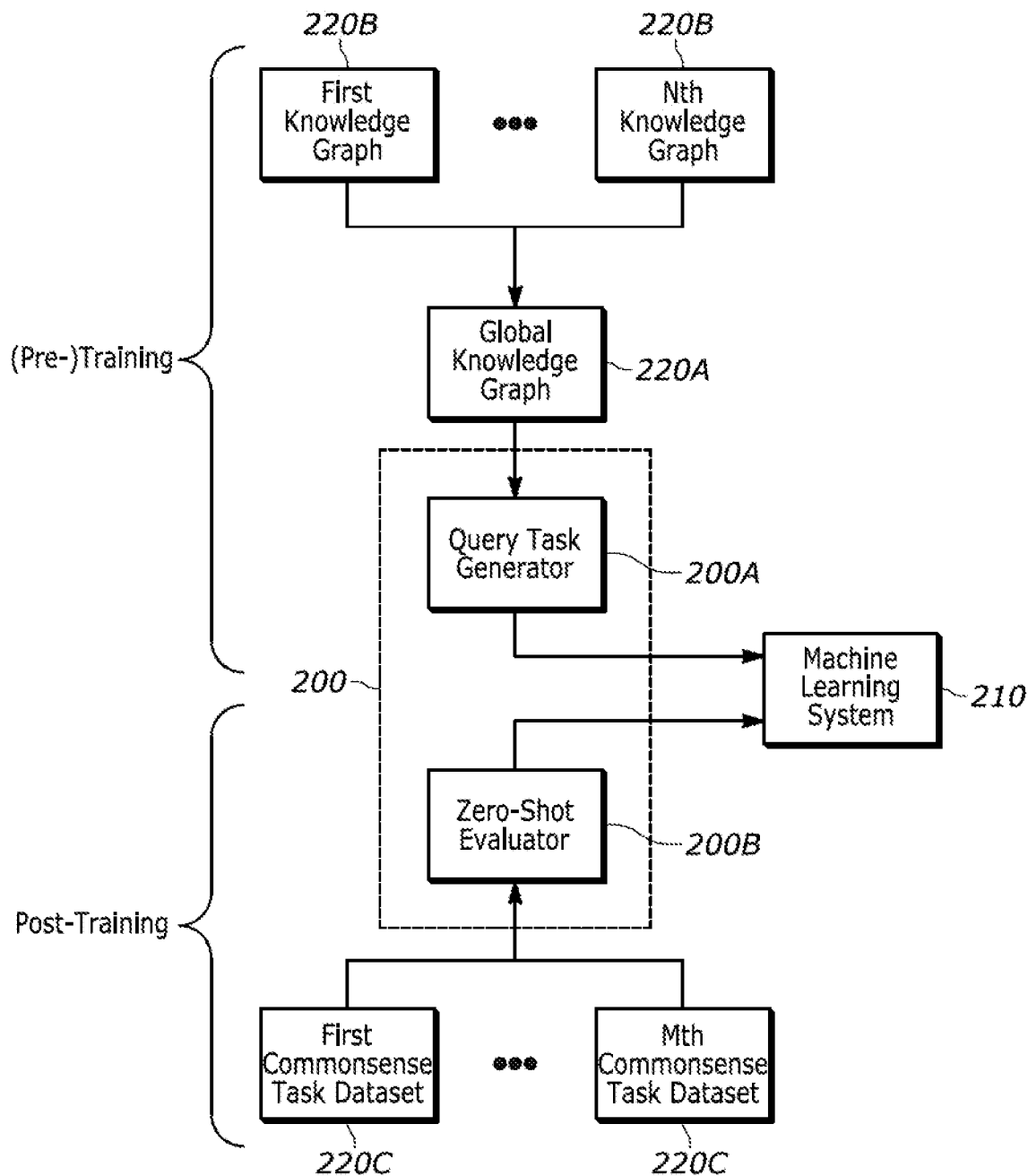
FIG. 2 is a conceptual diagram of an example of the framework for query tasks with respect to the machine learning system according to an example embodiment of this disclosure.

FIG. 2 is a conceptual diagram of an embodiment of neuro-symbolic framework 200 with respect to a machine learning system 210. In an example embodiment, the framework 200 includes at least a query task generator 200A. The query task generator 200A may be configured to obtain data structures (e.g., triples) from a global knowledge graph 220A. As shown in FIG. 2, the global knowledge graph 220A includes a number of distinct knowledge graphs 220B, where the total number of knowledge graphs 220B is represented by "N" in FIG. 2. In this regard, "N" represents an integer number that is at least greater than two. The query task generator 200A is configured to generate query tasks based on the data structures of the global knowledge graph 220A. The query task generator 200A is configured to create a training set that includes a suitable number of query tasks. The query task generator 200A is configured to pre-train or train the machine learning system 210 with at least one training set. The query task generator 200A is also configured to compute at least one score for the machine learning system 210 and fine-time the machine learning system 210, for example, based on the score data, the loss data, and/or any other relevant data. The query task generator 200A ensures that the machine learning system 210 is pre-trained or trained to perform well across various commonsense tasks when tested in a zero-shot setting and/or when deployed/employed for use in an application.

In addition, the framework 200 is configured to include a zero-shot evaluator 200B. The zero-shot evaluator 200B is configured to perform zero-shot testing on the machine learning system 210. As indicated in FIG. 2, the zero-shot evaluator 200B is configured to perform the zero-shot testing during a post-training phase. The post-training phase refers to any phase that occurs after the pre-training (or training) of the machine learning system 210 with at least one training set that is generated by the query task generator 200A. The zero-shot evaluator 200B is configured to test the machine learning system 210 with a commonsense task dataset 220C in a zero-shot manner. In this regard, the machine learning system 210 is configured to process each commonsense task dataset 220C without having observed that commonsense task dataset 220C beforehand. The zero-shot evaluator 200B is configured to obtain a set of commonsense task datasets 220C and apply each commonsense task dataset 220C to the machine learning system 210. The set of commonsense task datasets 220C includes a number of commonsense task datasets 220C, where the total number of commonsense task datasets 220C is represented by 'M' in FIG. 2. In this regard, "M" represents an integer number that is at least greater than two. Each commonsense task dataset is 220C distinct from the other commonsense task datasets 220C of the set, for example, with respect to the format of the query task and/or the knowledge type associated with the query task. With the various commonsense task datasets 220C, the zero-shot evaluator 200B is advantageously configured to demonstrate the effectiveness of the pre-training (or training) of the machine learning system 210 based on the training set that was generated by the query task generator 200A. In this regard, the zero-shot evaluator 200B is configured to provide a robust measure of the reasoning abilities of the machine learning system 210. The zero-shot evaluator 200B is also configured to evaluate the machine learning system 210 along with the impact of the pre-training across various commonsense task dataset 220C.

As aforementioned, the set of commonsense task datasets 220C includes various commonsense task datasets 220C. Each commonsense task dataset 220C is distinct from the training set, which is generated by the query task generator 200A. The set of commonsense task datasets 220C are datasets, which the machine learning system 210 has not observed at all during its pre-training phase or training phase. In this regard, the set of commonsense task datasets 220C are selected to cover a diverse set of tasks, for instance, with respect to at least format (e.g., question answering, pronoun resolution, natural language inference, etc.), knowledge type (e.g., social knowledge, physical knowledge, etc.), or both format and knowledge type. For example, there may be a task dataset 220C that includes a natural inference task, where a beginning and ending of a story are given and where the task is to choose the more plausible hypotheses out of a set of response options. In addition, there may be a task dataset 220C that includes a broad range of commonsense aspects, where the task is to respond to a question by selecting one of five response options. As another example, there may be a task dataset 220C that focuses on physical reasoning, where the task is to pick a more plausible response option out of two possible continuations. Also, there may be a task dataset 220C that focuses on reasoning based on social interactions, where the task includes some context, a question, and a set of response options. As yet another example, there may be a task dataset 220C that involves pronoun resolution, where the task includes some context, an emphasized pronoun, and response options that are offered as possible references. Furthermore, the set of commonsense task datasets 220C are not limited to the aforementioned commonsense task datasets 220C, but may include any task dataset 220C that is suitable for performing zero-shot testing on the machine learning system 210.

Figure 3:
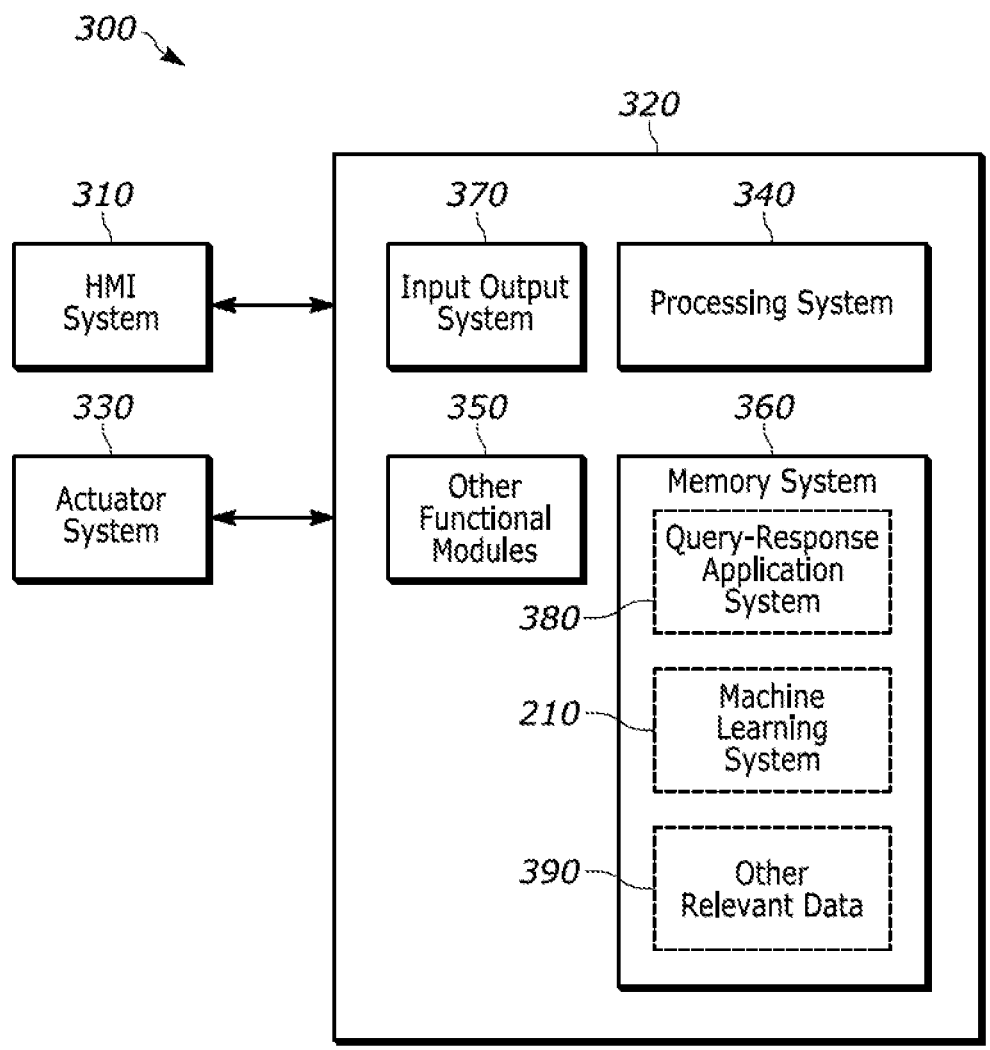
FIG. 3 is a diagram of an example of a control system that employs the machine learning system of FIG. 1 according to an example embodiment of this disclosure.

FIG. 3 is a diagram of a system 300, which is configured to include at least the pre-trained (or trained) machine learning system 210. In this regard, the system 300 includes at least an HMI system 310, a control system 320, and an actuator system 330. The system 300 is configured such that the control system 320 controls the actuator system 330 based on the input received from the HMI system 310. More specifically, the HMI system 310 includes one or more user interfaces and/or devices that communicate with one or more I/O devices of the IVO system 370. Upon obtaining input, the HMI system 310 is operable to communicate with the control system 320 via the input/output (I/O) system 370 and/or other functional modules 350, which includes communication technology.

The control system 320 is configured to obtain input from the HMI system 310. Upon receiving input, the control system 320 is operable to process the input via a processing system 340. In this regard, the processing system 340 includes at least one processor. For example, the processing system 340 includes an electronic processor, a central processing unit (CPU), a graphics processing unit (GPU), a microprocessor, a field-programmable gate array (FPGA), an application-specific integrated circuit (ASIC), processing circuits, any suitable processing technology, or any combination thereof. Upon processing at least the input received from the HI system 310, the processing system 340 is operable to provide the machine learning system 210 with a query or query task based on the input. The processing system 340 is also configured to generate a predicted answer via the machine learning system 210. The processing system 340 is configured to generate output data based on the predicted answer. The processing system 340 is configured to provide the output data and/or the predicted answer to the user via the I/O system 370 and/or the HMI system 310. In addition, the processing system 340 is operable to generate actuator control data based on the output data and/or the predicted answer. The control system 320 is configured to control the actuator system 330 according to the actuator control data.

The memory system 360 is a computer or electronic storage system, which is configured to store and provide access to various data to enable at least the operations and functionality, as disclosed herein. The memory system 360 comprises a single device or a plurality of devices. The memory system 360 includes electrical, electronic, magnetic, optical, semiconductor, electromagnetic, any suitable memory technology, or any combination thereof. For instance, the memory system 360 may include random access memory (RAM), read only memory (ROM), flash memory, a disk drive, a memory card, an optical storage device, a magnetic storage device, a memory module, any suitable type of memory device, or any number and combination thereof. In an example embodiment, with respect to the control system 320 and/or processing system 340, the memory system 360 is local, remote, or a combination thereof (e.g., partly local and partly remote). For example, the memory system 360 is configurable to include at least a cloud-based storage system (e.g. cloud-based database system), which is remote from the processing system 340 and/or other components of the control system 320.

The memory system 360 includes the machine learning system 210, which has been pre-trained (or trained) via the framework 200 (FIGS. 1-2). This pre-trained or trained machine learning system 210 is configured to be implemented, executed, and/or employed via the processing system 340. In this regard, the machine learning system 210 is configured to receive and process a query or query task as input data. The machine learning system 210 is configured to provide a predicted answer in response to the query or query task. In this regard, the machine learning system 210 is configured to perform question-answering.

In addition, the memory system 360 includes a query-response application system 380. The query-response application system 380 is configured to ensure that the machine learning system 210 is provided with a query or a query task as input data. In this regard, the processing system 340, via the query-response application system 380, is configured to process the input from the HMI system 310. If deemed necessary, the query-response application system 380 is configured to generate a query or query task upon processing the input from the HMI system 310. In addition, in some instances, the query-response application system 380 is configured to generate output data based on the predicted answer obtained from the machine learning system 210. In general, the query-response application system 380 enables the machine learning system 210 to operate seamlessly as a part of the control system 320 for the desired application.

Furthermore, as shown in FIG. 3, the system 300 includes other components that contribute to operation of the control system 320 in relation to the HMI system 310 and the actuator system 330. For example, as shown in FIG. 3, the memory system 360 is also configured to store other relevant data 390, which relates to the operation of the system 300. Also, as shown in FIG. 3, the control system 320 includes the VO system 370, which includes one or more/O devices that relate to the system 100. Also, the control system 320 is configured to provide other functional modules 350, such as any appropriate hardware technology, software technology, or any combination thereof that assist with and/or contribute to the functioning of the system 300. For example, the other functional modules 350 include an operating system and communication technology that enables components of the system 300 to communicate with each other as described herein. Also, the components of the system 300 are not limited to this configuration, but may include any suitable configuration as long as the system 300 performs the functionalities as described herein. For example, the HMI system 310 may be a more integral part of the IVO system 370 and/or the control system 320. Accordingly, the system 300 is useful in various applications.

For example, as a non-limiting example, the system 300 may be a dialogue system, which is used to provide customer service and/or troubleshooting assistance. In this case, the system 300 does not further include the actuator system 330. In this regard, for instance, the HMI system 310 may include a user interface, which operates with the I/O system 370, such as a touchscreen device, to receive input from a user. Upon entering input data into the touchscreen device, the processing system 340 is configured to provide a query or query task to the pre-trained or trained machine learning system 210. In response to the query or query task, the processing system 340 is configured to provide a predicted answer via the machine learning system 210. The processing system 340 is configured to provide the predicted answer directly or indirectly as output data, which is received by the user via the touchscreen device.

Figure 4:
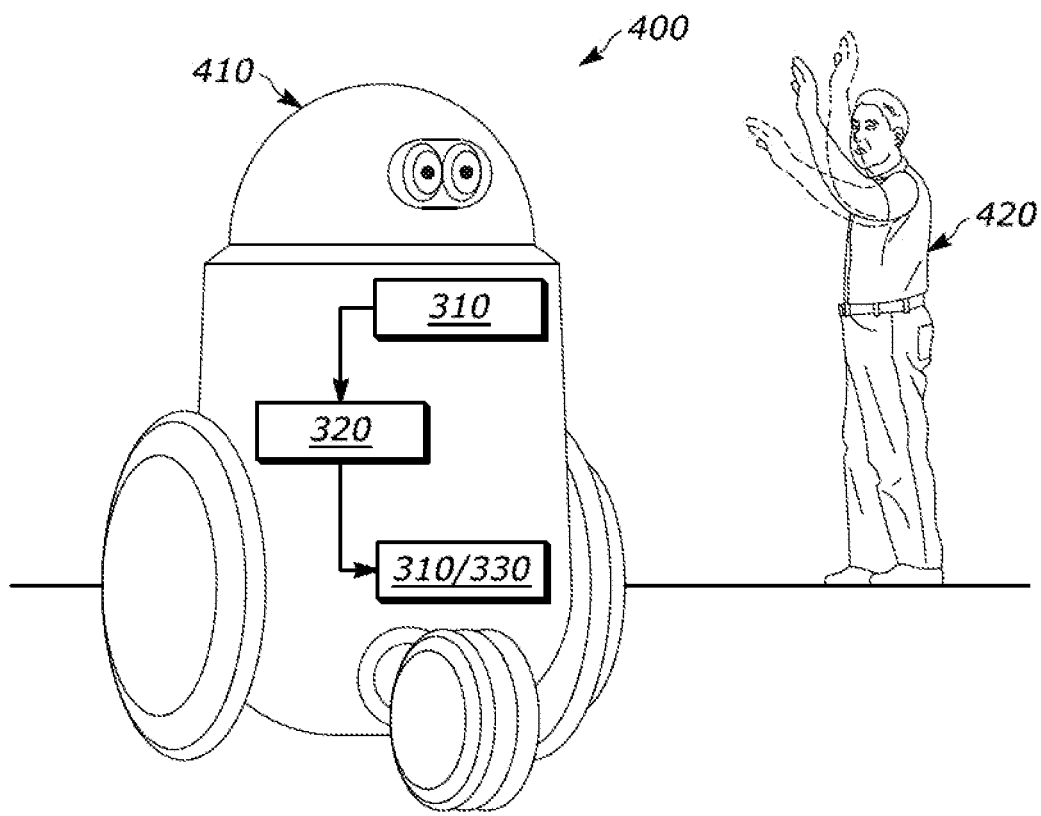
FIG. 4 is a diagram of an example of the control system of FIG. 3 with respect to robot and/or automated personal assistant technology according to an example embodiment of this disclosure.

FIG. 4 is a diagram of an example of an application of the system 300 with respect to automated personal assistant technology 400 according to an example embodiment. For instance, as one non-limiting example, the automated personal assistant technology 400 is a robot 410, which is configured to receive input that may directly or indirectly contain a query or query task. The automated personal assistant technology 400 is configured to process the input and provide a query or query task to the machine learning system 210. In response to the query or query task, the automated personal assistant technology 400 is configured to provide a predicted answer via the pre-trained or trained machine learning system 210. In addition, the automated personal assistant technology 400 is configured to control an appliance, such as a washing machine, a stove, a vacuum cleaner, an oven, a microwave, a dishwasher, another type of domestic appliance, any suitable apparatus, or any number and combination thereof. The HMI system 310 includes at least one user interface that operates together with the I/O system 370 (e.g., a microphone, a touchscreen, a keyboard, display technology, gesturing technology, a camera, a sensor, or any suitable technology) to obtain input.

The control system 320 is configured to obtain the input (e.g., audio commands, touchscreen commands, etc.) from the user 420 via the HMI system 310 and/or the I/O system 370. The control system 320 is configured to process the input. The control system 320 is configured provide a query or query task based on the input. In addition, the control system 320 is configured provide a predicted answer in response to the query or query task via the pre-trained or trained machine learning system 210. The control system 320 is configured to generate output data based on the predicted answer. The control system 320 is configured to provide the predicted answer and/or the output data to the I/O system 370 and/or the HMI system 310. The control system 320 is configured to generate actuator control data based on the predicted answer and/or the output data. Also, as a non-limiting example, in response to the actuator control data, the control system 320 is configured to control the actuator system 530.

Figure 5:
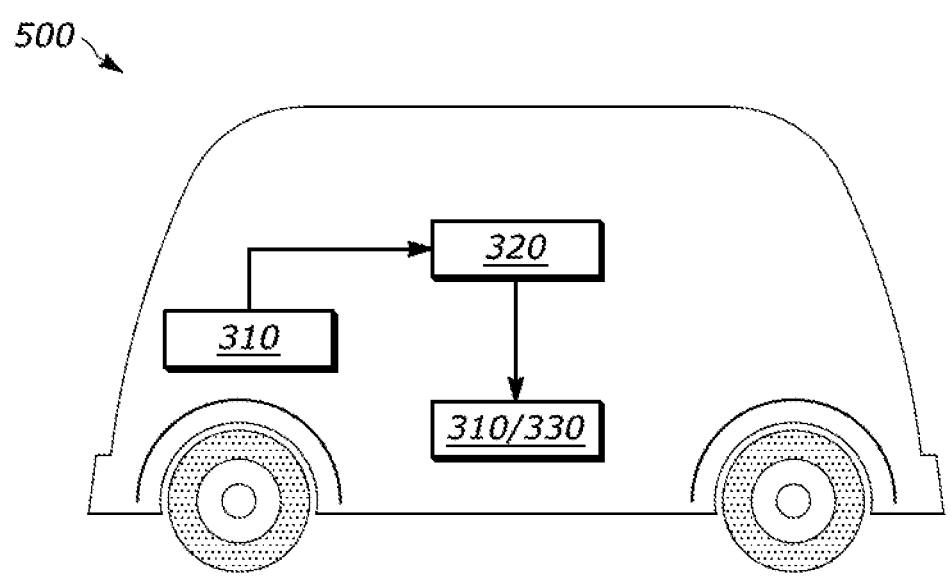
FIG. 5 illustrates a diagram of an example of the control system of FIG. 3 with respect to mobile machine technology according to an example embodiment of this disclosure
Figure 7:
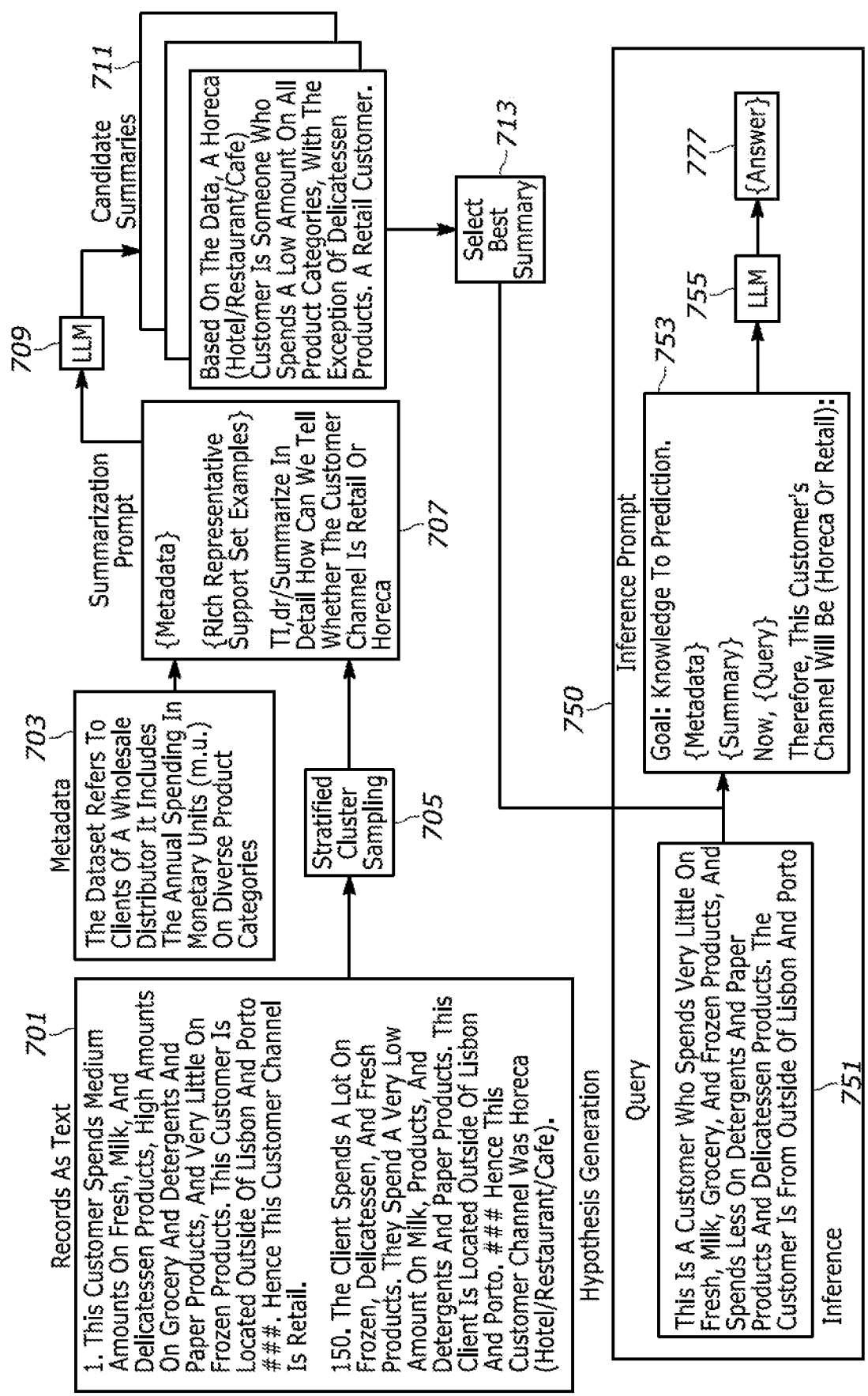
FIG. 7 illustrates an embodiment of a process of generating summaries and using the summaries to make predictions on new data.

FIG. 5 is a diagram of an example of an application of the system 300 with respect to mobile machine technology according to an example embodiment. As a non-limiting example, the mobile machine technology includes at a vehicle 500, which is at least partially autonomous or fully autonomous. In FIG. 7, the vehicle 500 includes an HMI system 310, which is configured to receive input. Based on the input, the control system 320 is configured to provide at least a query or query task to the machine learning system 210. The machine learning system 210 is configured to provide a predicted answer in response to a query or query task. The control system 320 is configured to generate actuator control data, which is at least based on predicted answer. For instance, as a non-limiting example, the actuator system 330 is configured to actuate at least the braking system to stop the vehicle 500 upon receiving the actuator control data. In this regard, the actuator system 330 is configured to include a braking system, a propulsion system, an engine, a drivetrain, a steering system, or any number and combination of actuators of the vehicle 500. The actuator system 330 may be configured to control the vehicle 500 so that the vehicle 500 follows rules of the roads and avoids collisions based at least on the predicted answer provided by machine learning system 210.

Figure 6:
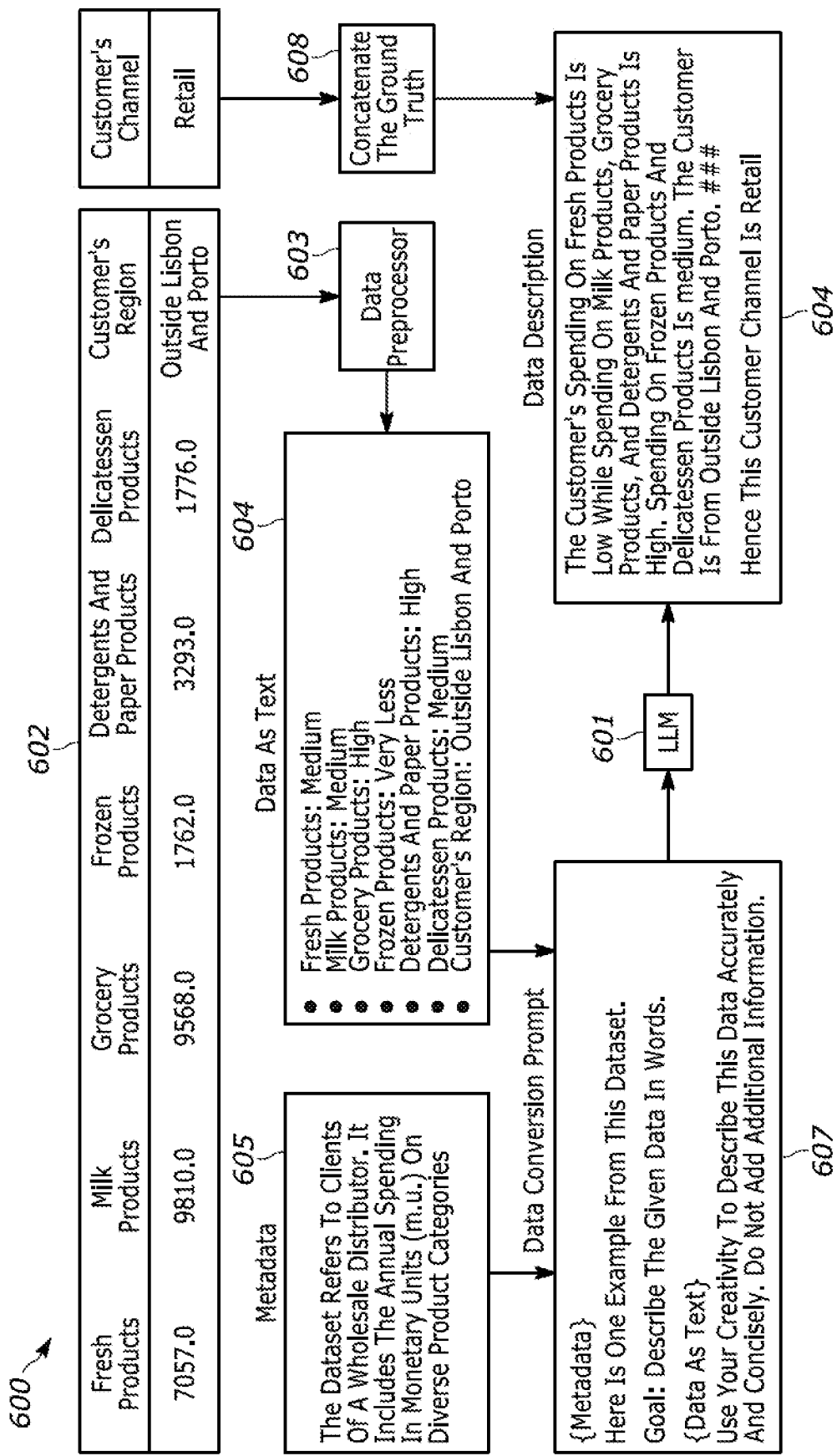
FIG. 6 illustrates an embodiment of a system conversion for a data point.

FIG. 6 discloses an embodiment of a system conversion for a data point on an embodiment of a wholesale customer's data set. To utilize large language models (LLMs) with tabular data 602, it may be necessary to first convert the records 602 into natural language descriptions. These conversions may be referred to as data descriptions 604. The data descriptions 604 may be conducted utilizing a data processor 603. Template matching, commonly used in previous approaches, inserts attribute values into predefined templates. However, this approach may often produce unnatural descriptions that differ from how humans might describe the data. Depending on the dataset, designing the template by hand can also be challenging. To overcome this, the system may utilize LLMs 601 as a more suitable solution. As illustrated below in FIG. 6, the system can get these data descriptions with little effort by zero-shot prompting the LLM 601 with information about the dataset (which is generally available as metadata 601 for tabular datasets) and a textual representation 606 of the tabular record (e.g., parsed JSON). For example, the metadata 601 may indicate information about a data set, such as a description. The textual representation 606 may be text indicative of the records or tabular data. Specifically, to ensure examples can serve as both training data and query inputs, the system extract the descriptions of the features and concatenate 608 them with the target label using a separator token. Interestingly, the descriptions generated by LLM 601 this way often perform better than those from a template.

In one embodiment, a challenge in this process may be how to encode numerical attributes effectively: naively including numerical values in the descriptions can lead to poor performance in subsequent learning tasks. To address this, the system may adopt a straightforward approach, such as bin all numerical features into percentiles and encode them descriptively as "low," "medium," and "high," in the textual representation 506. Overall, the data descriptions can be generated automatically with minimal manual engineering.

A typical method for performing few-shot learning with large language models (LLMs) involves providing a small number of demonstrations of the intended task as a prompt and then asking the model to generate an answer. One could, for instance in the few-shot setting, simply present the natural language descriptions above and generate predictions on new examples. However, for tabular data, there may be a larger number of data points that do not fit within the LLM context. Furthermore, increasing the number of examples in the context naively does not always improve performance, and there was no obvious way to manage weighted distributions over examples as is required in boosting methods. These observations necessitate alternative approaches to weak learning via LLMs. An example of a cluster sampling algorithm is shown below.

---

Algorithm 1 Cluster Sampling:

1: Input: X, all training data; y, all training label; r, ratio of classes; p, AdaBoost weights of the current round; s, target number of samples. ▷ r[k]is the proportion of examples in class I.
2: S ← new empty set
3: w ← new array with same length as X filled with −1 ▷ w[i]is probability of sampling example i.
4: for k = 1 to number of target classes in y do
5: E ← GPTEmbedding(X[y = = k])E refers to the embeddings of the data descriptions
6: C ← AgglomerativeClustering(E). $C_j$ is set of data indices present in the $j^{th}$ cluster.
7: c ← new empty array same size as C. c[j] will store sampling probability of cluster j.
8: for j = 1 to len(C) do 9: $c[j] \frac{len(X)}{lenC_j}$ 10: end for
11: for i = 1 to len (X) do
12: w[i] ← c[j], such that, i ∈ $C_j$
13: end for
14: w ← Normalize(Normalize(w) * p) ▷ Normalize turns weights to a probability distribution.
15: Sample s * r[c] examples from X using categorical distribution w and append to S.
16: end for
17: Return S

---

FIG. 7 discloses a process of generating summaries and using the summaries to make predictions on new data. The system may propose instead that producing summaries of a collection of examples can serve as a powerful proxy for learning models based upon some number of examples. Concretely, given a set of data descriptions, the system may first perform summarization 707 on the data by calling the LLM 709 (e.g., by concatenating a list of examples in natural language form and appending the prompt "tldr"). This resulting summary 707 can be seen as a hypothesis as it provides an explanation for the data. By using the summary as a prompt, the LLM 709 in turn uses the hypothesis to perform inference instead of the raw data description (as shown in FIG. 7). Since the sampled summary can sometimes be noisy, the system may generate a fixed number of summaries 711 and pick the one with the smallest validation error rate at step 713. In case of a tie, the system may select the summary with a higher training error, e.g., lower generalization gap. Several methods of building such summaries are possible, but simple approaches such as the "tldr" approach may work as well as more sophisticated alternatives.

---

Algorithm 2 Summary Boosting [Compact]

1: Input: X, all training data; y, all training label; T: maximum number of rounds; s: size of the sampling subset; r: ratio of classes. ▷ r[k] denotes the proportion of examples in class k.
2: h, ϵ, α ← new empty arrays of length T.
3: N ← len(X); K ← number of target classes in y.

4: w ← new array of length N filled with $\frac{1}{N}$     ▷ w is the data distribution 5: for r = 1 to T do
6: ($X_s$, $Y_s$) ← ClusterSampling(X, y, r, w, s)     ▷ samples training examples from distribution w.
7: h [r] ← Summary $X_s$, $y_s$     ▷ h [r] is the weak learner in the current round r.

8: $\epsilon[r] \leftarrow \frac{\sum_{k=1}^{N} w[i] * 1\{h[r](X[i]) \neq y\{i\}\}}{\sum_{k=1}^{N} w[i]}$     ▷ ϵ [r] is the weighted error at round r.

9: if ϵ [r] ≥ 1 − $\frac{1}{K}$ then

10: Goto Step 6.
11: end if

12: $\alpha[r] \leftarrow \log\left(\frac{1-\epsilon[r]}{\epsilon[r]}\right) + \log(K-1)$     ▷ α[r] refers to coefficient of the hypothesis at round r.

---
Algorithm 2 Summary Boosting [Compact]
---

13:   for i = 1 to N do
14:     w[i] = w[i] * exp(α[r]𝟙{P[r][h[r](X[i])] ≠ y[i]})
15:   end for
16:   w ← Normalize (w)
17: end for
18: Return h, α

---

The process shown in FIG. 7 may split hypothesis generation 701 at the top half to described how weak learning hypothesis (summary) is generated. The bottom half is an illustrative embodiment of the system performing inference 750. The records as text may be utilized to conduct a stratified cluster sampling. The system and method may utilize weighted cluster sampling 705 in one embodiment, or stratified cluster sampling 705. Since the context size of existing LLMs is still limited, the system may not be able to fit the entire dataset into the context for summarization 707. The summarization prompt 707 may also include the associated metadata 703 of the record or text. Furthermore, boosting algorithms require that the system may provide weak learners on weighted samples of the training set, effectively guiding the boosting process to focus on "harder" examples as the boosting process continued. Thus, instead of attempting to summarize the entire dataset, the system may utilize only a representative subset of the dataset. The size of this subset is governed by the maximum context size and size of the data descriptions. To select this representative subset, the system may use weighted stratified sampling using subpopulations defined by clusters of language embeddings of each data description. The language embeddings may be sentence representations generated by GPT-3, GPT-4, or other language prediction models. In particular, the system may use hierarchical agglomerative clustering to identify clusters in the embedding. Such a process is shown above in Algorithm 1. Such a process is able to consistently produce weak learners, and able to improve upon random guessing under the distribution of interest (denoted by the input p to the algorithm).

Finally, the system may utilize the Adaptive Boosting ("AdaBoost") algorithm to produce an ensemble with these collections of summary based weak learners. Adaptive Boosting may utilize weights that are re-assigned to each instance, with higher weights assigned to incorrectly classified instances. Boosting is used to reduce bias, as well as variance for supervised learning. It works on the principle of learners growing sequentially. Except for the first learner, each subsequent learner is grown from previously grown learners. Thus, weak learners are converted into strong ones. One of the ideas of AdaBoost is to fit a sequence of weak learners on repeatedly modified versions of the data. The algorithm may be carried out over T rounds, where the weights of the training data points are adjusted based on the training error.

Given a new data point or query 751, the predictions from classifiers from all rounds may then combined through a weighted majority vote to produce the final prediction 777 or answer 777. The system use the error on a holdout validation set to determine the number of rounds T. A compact version of this process is presented in Algorithm 2. In the algorithm, the Summary method summarizes the examples in the prompt via the process discussed related to weak learning via summarization. Each summary can be treated as a hypothesis that can classify new data.

However, unlike the summary process, where the system may resample multiple times to find the best learner, the boosting process returns immediately when a summary with an error rate better than random guessing (or chance) is found. The system and method may utilize Cluster Sampling to subsample a mini-batch of examples that fit within the LLM's max context length.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for natural-language processing, comprising:
   receiving tabular data associated with one or more records;
   converting the tabular data to a text representation indicative of the tabular data;
   generating metadata associated with the text representation of the tabular data, wherein the metadata is indicative of a description of the tabular data;
   for one or more iterations, outputting one or more natural language data descriptions indicative of the tabular data in response to utilizing a large language model (LLM) and zero-shot prompting of the metadata and text representation of the tabular data, wherein the LLM includes a neural network with a plurality of parameters;
   for one or more iterations, outputting one or more summaries utilizing the LLM, wherein the one or more summaries include less text than the one or more natural language data descriptions;
   for one or more iterations, selecting a single summary of the one or more summaries in response to the single summary having a smallest validation rate;
   receiving a query associated with the tabular data;
   for one or more iterations, outputting one or more predictions associated with the query utilizing the LLM on the single summary and the query; and
   in response to meeting a convergence threshold with the one or more predictions generated from the one or more iterations, outputting a final prediction associated with the query, wherein the final prediction is selected in response to a weighted-majority vote of all of the one or more predictions generated from the one or more iterations.

2. The method of claim 1, wherein the LLM does not utilize fine-tuning or building of a new language model to output the final prediction.

3. The method of claim 1, wherein the plurality of parameters is over one billion.

4. The method of claim 1, wherein the LLM is GPT-4.

5. The method of claim 1, wherein the text representation is a parsed JSON file.

6. The method of claim 1, wherein any numerical features associated with the tabular data are encoded into percentiles.

7. The method of claim 1, wherein outputting one or more summaries utilizing the LLM includes appending a prompt on the one or more natural language data descriptions.

8. The method of claim 1, wherein the one or more predications are weak learners.

9. The method of claim 1, wherein method includes utilizing weighted stratified sampling for selecting the single summary.

10. A system, comprising:
    an input interface to the system, wherein the input interface is configured to receive data associated with the system; and
    one or more processors in communication with the input interface, the one or more processors processor programmed to:
      receive tabular data associated with one or more records;
      convert the tabular data to a text representation indicative of the tabular data;
      generate metadata associated with the text representation of the tabular data, wherein the metadata is indicative of a description of the tabular data;
      output one or more natural language data descriptions indicative of the tabular data in response to utilizing a large language model (LLM) and zero-shot prompting of the metadata and text representation of the tabular data, wherein the LLM includes a neural network with a plurality of parameters;
      output one or more summaries utilizing the LLM and the one or more natural language data descriptions, wherein the one or more summaries include less text than the one or more natural language data descriptions;
      for one or more iterations, select a single summary of the one or more summaries in response to the single summary having a smallest validation rate;
      receive a query associated with the tabular data;
      for one or more iterations, output one or more predictions associated with the query utilizing the LLM on the single summary and the query; and
      in response to meeting a convergence threshold with the one or more predictions generated from the one or more iterations of outputting one or more predictions, output a final prediction associated with the query.

11. The system of claim 10, wherein the processor is further programmed to output the final prediction in response to a weighted-majority vote of all of the one or more predictions generated from the one or more iterations.

12. The system of claim 10, wherein numerical features associated with the tabular data are encoded into percentiles.

13. The system of claim 10, wherein the one or more processors are programmed to output one or more summaries utilizing the LLM and appending a prompt on the one or more natural language data descriptions.

14. The system of claim 10, wherein the one or more processors are collectively programmed to execute steps.

15. The system of claim 10, wherein the one or more processors includes a single processor programmed to execute steps.

16. The system of claim 10, wherein the one or more processors are programmed to select a representative subset of the one or more summaries utilizing weighted stratified sampling.

17. The system of claim 10, wherein the one or more processors are programmed to select a representative subset of the one or more summaries utilizing weighted stratified sampling.

18. The system of claim 10, wherein the one or more processors are programmed to select a representative subset of the one or more summaries from a fixed number of iterations.

19. The system of claim 10, wherein the processor is programmed to, for one or more iterations, output the one or more natural language data descriptions and output the one or more summaries.

20. A computer-implemented method for natural-language processing, comprising:
    receiving tabular data associated with one or more records;
    converting the tabular data to a text representation indicative of the tabular data;
    generating metadata associated with the text representation of the tabular data, wherein the metadata is indicative of a description of the tabular data;

outputting one or more natural language data descriptions indicative of the tabular data in response to utilizing a large language model (LLM) and zero-shot prompting of the metadata and text representation of the tabular data;

outputting one or more summaries utilizing the LLM and appending a prompt on the one or more natural language data descriptions, wherein the one or more summaries include less text than the one or more natural language data descriptions;

for one or more iterations, selecting a single summary of the one or more summaries in response to the single summary having a smallest validation rate;

creating a subset of single summaries;

receiving a query associated with the tabular data;

for one or more iterations, output one or more predictions associated with the query utilizing the LLM on one of the single summaries of the subset of single summaries and the query;

creating a subset of one or more predictions; and in response to meeting a convergence threshold with the subset of one or more predictions, output a final prediction associated with the query, wherein the final prediction is selected in response to a weighted-majority vote of the subset of one or more predictions.

* * * * *